United States Patent
Berthold et al.

[19]

[11] Patent Number: 6,152,642
[45] Date of Patent: Nov. 28, 2000

[54] CONNECTION BETWEEN TWO COMPONENTS

[75] Inventors: Lothar Berthold, Stuttgart; Heinz Entenmann, Winterbach; Georg Frentz, Nürtingen; Eberhard Klemm, Esslingen; Martin Müller, Friolzheim; Rainer Vogel, Ketsch, all of Germany

[73] Assignee: DaimlerChysler AG, Stuttgart, Germany

[21] Appl. No.: 09/265,303

[22] Filed: Mar. 9, 1999

[30] Foreign Application Priority Data

Mar. 10, 1998 [DE] Germany .......................... 198 10 198
Sep. 26, 1998 [DE] Germany .......................... 198 44 211

[51] Int. Cl.[7] .................................................. F16B 21/18
[52] U.S. Cl. ........................... 403/155; 403/79; 411/522; 24/669
[58] Field of Search .............................. 403/79, 116, 150, 403/152, 154, 155, 157, 232.1, 330; 24/669, 702; 411/522, 523, 524, 512, 351, 352, 353

[56] References Cited

U.S. PATENT DOCUMENTS

| | | | |
|---|---|---|---|
| 1,556,108 | 10/1925 | Harbert | 411/523 |
| 2,239,004 | 4/1941 | Jung | 24/669 |
| 3,481,637 | 12/1969 | Penta | 403/154 |
| 4,916,968 | 4/1990 | Kabaya | 403/79 X |
| 5,219,256 | 6/1993 | Ford et al. | 411/522 X |
| 5,335,522 | 8/1994 | Stadelmann et al. | 403/155 X |
| 5,971,651 | 10/1999 | Gornick et al. | 403/79 |

FOREIGN PATENT DOCUMENTS

0 583 580   2/1994   European Pat. Off. .

Primary Examiner—Lynne H. Browne
Assistant Examiner—David E. Bochna
Attorney, Agent, or Firm—Klaus J. Bach

[57] ABSTRACT

In a connection between a first component having a U-shaped fork with two essentially parallel spaced legs having recesses formed therein and a second component having a portion disposed between the legs and a bolt extending into the recesses, the ends of the bolt are engaged in the recesses by spring clamps which hold the bolt in firm contact with wall portions of the recesses so as to provide for a play-free pivot connection between the two components.

9 Claims, 5 Drawing Sheets

CONNECTION BETWEEN TWO COMPONENTS

BACKGROUND OF THE INVENTION

The invention relates to a connection between first and second components, wherein the first component includes a U-shaped fork member having spaced legs with openings in which a bolt connected to the second component is received and locked in position.

Such a connection is used for example in motor vehicles particularly for the connection of a brake pedal to a braking apparatus (master brake cylinder). Since the angle between the brake pedal and the braking apparatus connected thereto changes continuously during actuation of the brake pedal, the connection must be pivotable about an axis which is normal to a plane in which the angle between the brake pedal and the braking apparatus is formed. This pivotability is achieved with the connection of the type referred to above in that the connecting bolt extends co-axially with this pivot axis or forms this pivot axis. In order to form such a connection between the brake pedal and the braking apparatus, the legs of the fork of the one component (for example, the braking apparatus) and the area of the other component which is disposed between the legs include bores through which the bolt extends. The bolt is connected to the braking apparatus and to the pedal in a form-fitting manner so as to be able to transmit forces therebetween. The bolt is secured in the fork for example by splints.

Between the outer diameter of the bolt and the inner diameter of the bore in the brake pedal and also between the outer diameter of the bolt and the inner diameter of the bores in the fork legs of the braking apparatus there is generally some play which in this case is added up. With new control and brake systems in which the brake pedal position represents an important control parameter or with control and brake systems which act on the brake pedal by way of the brake apparatus, such a play in the connection between the brake apparatus and the brake pedal may result in errors or malfunctions. Furthermore, the play in the connection between the brake pedal and the brake apparatus may be the cause for noises, which reduce the travel comfort of the vehicle occupants.

It is the object of the present invention to provide such a connection which is free of any play, but which, nevertheless, can easily be established.

SUMMARY OF THE INVENTION

In a connection between a first component having a U-shaped fork with two essentially parallel spaced legs having recesses formed therein and a second component having a portion disposed between the legs and a bolt extending into the recesses, the ends of the bolt are engaged in the recesses by spring clamps, which hold them in firm contact with a wall portions of the recesses so as to provide for a play-free pivot connection between the two components.

In order to simplify the connection of the fork of the one component to the bolt which is firmly connected to the other component, the legs of the fork include U-shaped recesses. The opposite side walls of the recesses are disposed in a plane, which extends normal to the plane in which the opposite legs of the fork are disposed. The U-shaped recesses in the legs can therefore be open in the same direction as the U-shaped fork. But the recesses may open in another direction, for example, normal to the opening direction of the fork.

In a preferred embodiment of the connection according to the invention, the wall of the recess with which the bolt is resiliently engaged is concave adjacent the bolt. Preferably, the concave wall portion has the same radius as the bolt has in the contact area. In this way, there is a particularly large surface area of the bolt and the fork in force transmitting contact, which simplifies play-free engagement of the bolt with the wall.

In another advantageous embodiment of the connection according to the invention safety means are provided, which secure the bolt in position in the recess of the fork. The safety means prevent the unwanted release of the components which are interconnected.

Preferably, these safety means are flexible tongues extending parallel to the legs and being the flexible in the plane of the legs. The flexible tongues are attached to the legs, or respectively, the fork in an area remote from the open end of the recess in the leg. The flexible tongues have openings into which the bolt extends and in which it is engaged radially at least in an area adjacent the open end of the recess in the leg such that the bolt is biased into contact with the recess wall. With this arrangement, the tongues are caught each at one of the axial ends of the bolt inserted into the fork legs. In this way, the bolt is firmly held against movement in the direction out of the recess. Since such a safety means is provided only for the case that the bolt removal forces exceed the spring forces of the spring means some play between the bolt and the opening in the leg can be tolerated.

In order to make the connection of the fork of the one component with the bolt, which is firmly mounted on the other component, as simple and safe as possible, the recesses in the fork legs are open-ended slots. Each slot is preferably so disposed in the respective leg that the bolt inserted into the slot is engaged by the recess walls in a form-fitting manner at least in the direction in which forces are transmitted between the bolt and the legs. As a result, forces can be transmitted, at least in the push and pull direction without resulting in a disengagement of the connection. The spring means hold the bolt in the slots in engagement with a wall area of the slot under certain tension forces so that there is no play between the slot wall and the bolt that is their relative positions are well defined. The bolt can be moved out of its predetermined position in the slot only against the pretension forces of the spring means so that a dislocation of the bolt, that is, its movement out of the slot is prevented by the spring means.

A wall area of the slot which is subjected by the bolt to tension forces may be so shaped that the bolt is guided in the slot so that the pulling force effective between the bolt and the fork do not have force components capable of moving the bolt out of the slot. Rather a force component may be generated which tends to move the bolt into the slot. The wall area engaged by the bolt may be disposed essentially normal to the force direction. In this way, accidental disengagement is prevented.

A wall area of the slot subjected to pressure forces of the bolt may be so formed that, with the pressure forces acting between the bolt and the fork, a force component is generated, which tends to move the bolt into the slot. In this way, the connection is made safe by the forces transmitted between the components. With this connection the predetermined relative positions of the fork and the bolt should correspond to the end position of the bolt provided by the guide surface in the slot. For example, in a connection, wherein the well defined relative position is important for the transmission of pressure forces, the guide wall areas of the slot subject to the pressure forces bias the bolt toward the relative position into which the bolt is also biased by the spring means and where the is in engagement with the wall of the slot.

The spring means include a first spring leg which biases the bolt relative to the fork essentially in a direction transverse to the direction of force transmission and transverse to the longitudinal bolt axis, against the wall of the slot. In this way, the bolt is positioned relative to the fork in a first coordinate direction of a slot plane in a defined way.

In a connection in which the play-free position of the bolt relative to the fork is important for the transmission of pressure forces the spring means include a second spring leg which biases the bolt relative to the fork in the force transmission direction against the wall area engaged by the bolt during the transmission of pressure forces. In this way, the position of the bolt relative to the fork is defined also in a second coordinate direction of the slot plane. In another embodiment of the connection according to the invention wherein the position of the bolt relative to the fork is important for the transmission of pulling forces, the second spring leg is so formed and arranged that the bolt is biased against the wall areas of the slots which are engaged by the bolt when pulling forces are transmitted.

Further advantages and features of the connection according to the invention will be described below on the basis of the accompanying drawings.

DESCRIPTION OF PREFERRED EMBODIMENTS

Figure 1:
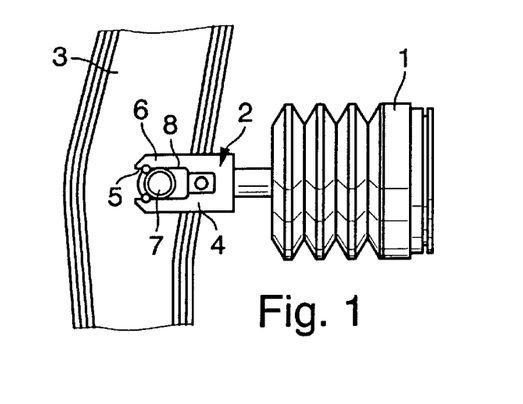
FIG. 1 is a side view of a connection according to the invention between two building components.

As shown in FIG. 1, a first component 1 which, in the embodiment is part of a brake apparatus, includes a fork 2 by way of which it is connected to a second component 3, which in the example is a brake pedal. The fork 2 is U-shaped as best seen in FIGS. 4, 6, 8 and 12.

The fork 2 includes two essentially parallel opposite legs 4, which are also U-shaped to form a mouth-like recess 5. The recess 5 of each leg 4 is formed by two opposite parallel arms 6. The arms 6 of a leg 4 are disposed opposite each other in a plane, which is normal to a plane in which the legs 4 of the fork are disposed opposite each other.

For the attachment to the component 3, that is, the brake pedal, the brake pedal has an area, which projects between the legs 4 of the fork 2, that is, into the mouth-like opening of the fork 2. In this area of the brake pedal 3, a bolt 7 is mounted to the brake pedal 3. The bolt 7 may be press-fitted into corresponding bores. The bolt 7 may also be welded to the brake pedal 3. The bolt 7 may consist of two partial bolts, which are attached at opposite sides of the brake pedal 3.

Figure 2:
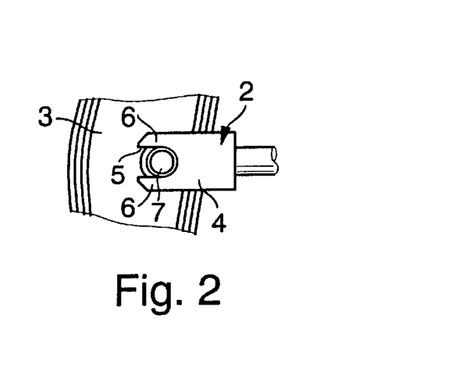
FIG. 2 is a detail view of the connection of FIG. 1 without spring means.

The bolt 7 is so attached to the brake pedal 3, that it extends about normal to the parallel planes in which the legs 4 of the fork 2 are disposed. To make the connection according to the invention, the fork is so attached to the bolt 7 that the bolt 7 extends into the recesses 5 of the legs 4. At the ends of the recesses 5 opposite their open ends the recesses 5 of the legs 4 are rounded so as to have the same radius as the bolt 7. This particular shape of the end of the recess is shown clearly in FIG. 2 in which the spring clamp 8 has been omitted for better illustration.

FIGS. 1, 4, 6, and 8 show how the bolt 7 is pulled into the mouth or, respectively, the recess 5 of the legs 4 and is biased therein by spring means 8 toward the base of the mouth or recess 5. For a better understanding the FIGS. 4, 6, 8 and 12 do not show the brake pedal 3, but only the bolt 7 which is firmly attached to the brake pedal 3.

Since the bolt 7 is solidly connected to the brake pedal 3, there is no play between the bolt 7 and the brake pedal 3. At the same time, the formation of a play between the bolt 7 and the wall of the recess 5 is prevented since the bolt 7 is firmly engaged with the wall. However, pivoting of the components 1 and 3 relative to each other about the pivot axis, that is, the axis of the bolt 7 is not prevented. In this way, a play-free connection between the components 1 and 3 is established.

The spring clamp 8 used for establishing the engagement between the bolt 7 and the wall of the leg recess 5 is in the given example a U-shaped spring clamp 9, which includes two opposite spring arms 10.

In the embodiment shown, the opposite spring arms 10 form at their free ends, a mouth opening where the spring arms 10 have a smaller distance from each other than in other areas of the spring clamp 9. In other words, the spring arms 10 are so shaped that, beginning at the open end of the U-shaped spring clamp 9, they form a first area 19 wherein the distance between the spring arms 10 becomes smaller from a value which is greater than the diameter of the bolt 7 to a value which is smaller than the diameter of the bolt 7. The first area 19 is followed by a second area 20 in which the distance between the spring arms 10 increases again. Preferably, the spring arms 10 are so shaped that, in the second area 20, the distance between the spring arms 10 increases up to the value of the diameter of the bolt 7.

In this way, the bolt 7 is engaged by the spring arms 10, when it is inserted into the recess 5 and into the spring clamp 9. The spring clamps 9 are so located on the legs 4, that the spring arms 10 are still spread apart by the bolt 7 when the bolt 7 comes to a rest at the end wall of the recess 5 opposite its open end. As a result, the spring arms 10 provide a suitable engagement force to the bolt 7, such that it is held in engagement with the wall of the recess 5 without play. During insertion of the bolt 7 into the spring clamp 9, the opposite spring arms 10 are spread apart. When the front ends of the spring arms 10 move together again after the bolt 7 moves past the first area 19, the spring force of the arms 10 causes the bolt 7 to move fully into engagement with the end wall of the recess 5. The bolt 7 is then held in engagement with the end wall by the spring clamp 9.

Figure 3A:
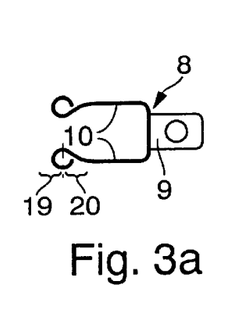
FIG. 3a is a side view of spring member.
Figure 3B:
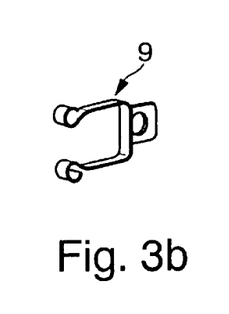
FIG. 3b is a perspective view of a spring member.
Figure 4:
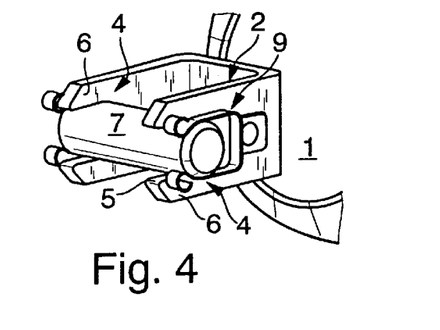
FIG. 4 is a perspective view of a fork with a bolt secured by a spring member as shown in FIG. 3.

In order to facilitate the mounting of the fork 2 to the bolt 7, the free ends of the spring arms 10 are bent outwardly as shown in FIGS. 3a, 3b, and 4. Then the spring arms 10 are automatically spread apart when the bolt 7 is inserted.

Figure 5A:
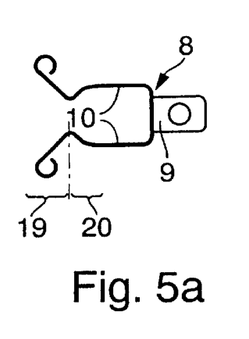
FIG. 5a is a side view of another spring member.
Figure 5B:
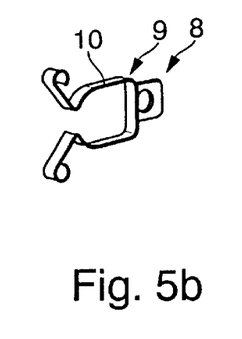
FIG. 5b is a perspective view of the spring member shown in FIG. 5a, FIG. 6 is a perspective view of a fork with bolt held in engagement with the fork by a spring member as shown in FIG. 5a, FIG. 7a is a side view of another spring clamp.
Figure 6:
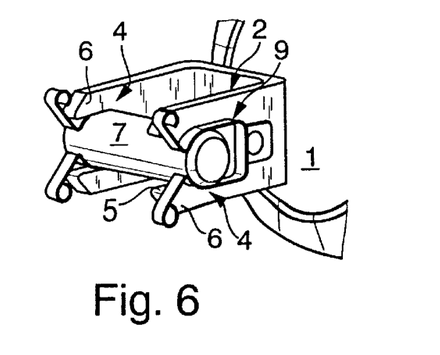

In an embodiment as shown in FIGS. 5a, 5b, and 6, the areas of the spring arms 10, which engage the bolt 7 are curved essentially according to the curvature of the bolt 7, whereby greater bolt retaining forces can be generated by the spring clamp 9. In order to further facilitate the insertion of the bolt 7 between the spring arm 10 when the fork 2 is attached to the bolt 7, the end areas 19 of the spring arms 10 include a portion in which the spring arms 10 extend further apart essentially in a straight line. In this way, a funnel-like mouth opening is formed for the spring clamp 9 as shown in FIG. 5a.

Figure 7A:
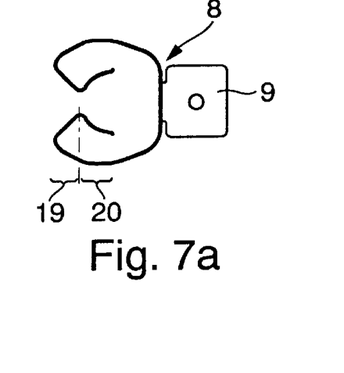
Figure 7B:
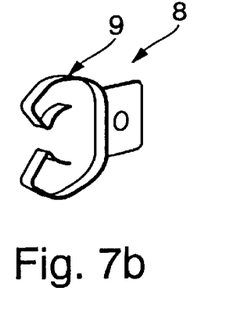
FIG. 7b is a perspective view of the spring clamp shown in FIG. 7a, FIG. 8 is a perspective view of a fork with a bolt held in engagement with the fork by a spring member as shown in FIG. 7a, FIG. 9 is a perspective view of a building component, which includes the spring means and a securing structure for being mounted to the fork.
Figure 8:
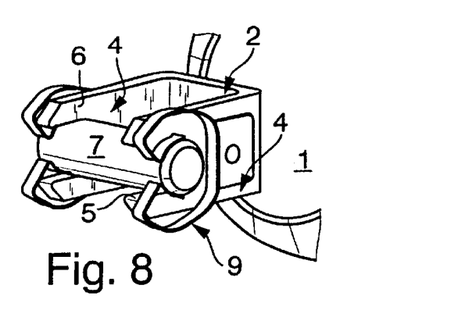

In an embodiment as shown in FIGS. 7a, 7b, and 8 the second areas 20 of the spring arms 10 are formed at their free, inwardly bent ends which are adapted in shape to contour of the bolt 7. In this way, the bolt 7 is engaged over a large surface area. This embodiment provides for a high spring force with a high engagement security preventing disengagement of the bolt 7 from the fork 2. The high engagement force of the bolt 7 with the wall of the recess 5 also ensures a play-free connection even if the (pull) forces between the brake apparatus 1 and the brake pedal 3 become relatively large. Also, in this arrangement, the entrance area is funnel-like (see FIG. 7a) to facilitate the mounting of the fork 2 to the bolt 7. The spring clamps 8 shown in FIGS. 1 and 3 to 8 are connected to the respective legs 4 of the fork 2, for example by a spot weld.

In an embodiment as shown in FIGS. 9 to 12, the spring clamps 9 are not attached directly to the respective legs 4 of the fork 2. Rather, they are part of a component 11, which includes a mounting area (clip structure) 12 by which it can be attached to the respective leg 4 of the fork 2. For locking the clip structure 12 to the leg 4, the clip structure 12 includes, at its side, projections or tabs 13, which cooperate with corresponding openings 14 in the leg 4. The projections 13 are received in the openings 14 of the leg 4 whereby the component 11 is attached to the leg 4 in a force transmitting fashion. Such a clip structure provides for sufficiently large retaining forces.

The clip structure 12 of the component 11 includes a tongue 15, which extends essentially parallel to the adjacent leg 4. The tongue 15 has an opening or bore 16 into which the end of the bolt 7 extends when the tongue is mounted on the leg 4 and the fork 2 is mounted to the bolt 7. In this way, a form-locking connection between the bolt 7 and the tongue 15 of the component 11, and consequently the leg 4 of the fork 2, is established. The tongue 15 including the opening 16 therefore safely prevents unintended disengagement of the bolt 7 from the fork 2. It is particularly advantageous if—as in the present case—the safety means (tongue 15) and the spring means (spring clamp 9) of a leg 4 are all incorporated in a single component 11, which can be mounted to the respective leg 4, or respectively, the fork 2. In this way, an inexpensive component 11 can be formed which fulfills the double functions of securing the connection and holding the bolt 7 in engagement with the fork 2 under tension.

In order to facilitate the mounting of the fork 2 to the bolt 7, the tongues 15 includes an insertion area. The insertion area is formed by the shape of the tongues 15, which are curved such that the free ends of the tongues at opposite sides of the fork 2 are spaced by a distance greater than the length of the bolt 7. Then, upon connection of the fork 2 to the bolt 7, the bolt 7 moves the tongues 15 apart. As the bolt 7 reaches the openings 16, the tongues 15 spring back to their original position as the bolt ends are received in the openings 16 for locking the bolt 7 in position in the recess 5. The tongues 15 consist of a flexible material and are resilient in a direction transverse to the plane of the respective associated leg 4.

Figure 9:
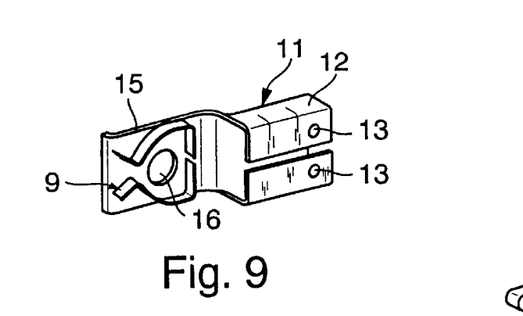
Figure 10:
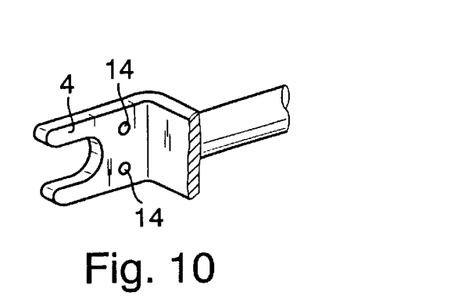
FIG. 10 is a perspective partial view of a fork for receiving the building component of FIG. 9.
Figure 11:
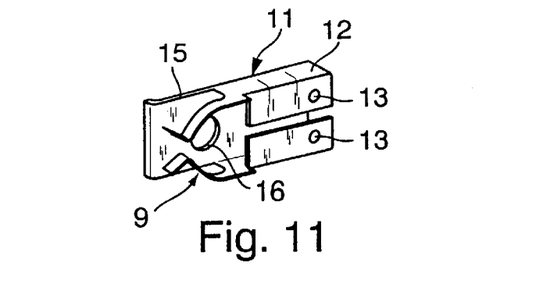
FIG. 11 shows another embodiment of the building component of FIG. 4, FIG. 12a and FIG. 12b are perspective views similar to those of FIGS. 4 and 6 showing different embodiments for the spring clamp.

In the embodiment of FIG. 9, the spring clamp 9 is disposed directly adjacent the tongue 15 whereas, in the embodiment of FIG. 11, the spring clamp 9 extends from the wall area 12 of the clamp structure 12. In the embodiment of FIG. 11, the securing means (tongue 15, opening 16) and the spring means (spring clamp 9) at opposite sides of the respective legs can cooperate with the bolt 7.

In an embodiment wherein, as shown in FIGS. 9 and 11, the spring means 8 or the spring clamp 9 is part of the component 11 forming the clamp structure 12, the spring arms 10 of the spring clamp 9 may extend through the opening 16 in the tongue 15. Then the spring means 10 are secured in the engagement position additionally by the inner circumferential structure of the opening 16. The spring clamp 9 is formed, for example, to extend from the area of the component 11 forming the clamping structure 12, and the opening 16 has a shape suitable to accommodate the spring arms 10. The tongue 15 and the clamping structure 12 extend in the embodiment of FIG. 12 parallel to, and opposite, each other so that the component 11 has a U-shaped form.

For the support of the spring arms 10 to increase the spring force that can be applied to the bolts 7, projections 17 are provided at the inner edges of the opening 16. The projections 17 form reinforcement structures, which engage the spring arms 10 when the bolt 7 is inserted between the spring arms 10 and the tongue 15 has engaged the bolt 7. They increase the spring force with which the bolt 7 is engaged by the spring arms 10.

Figure 12A:
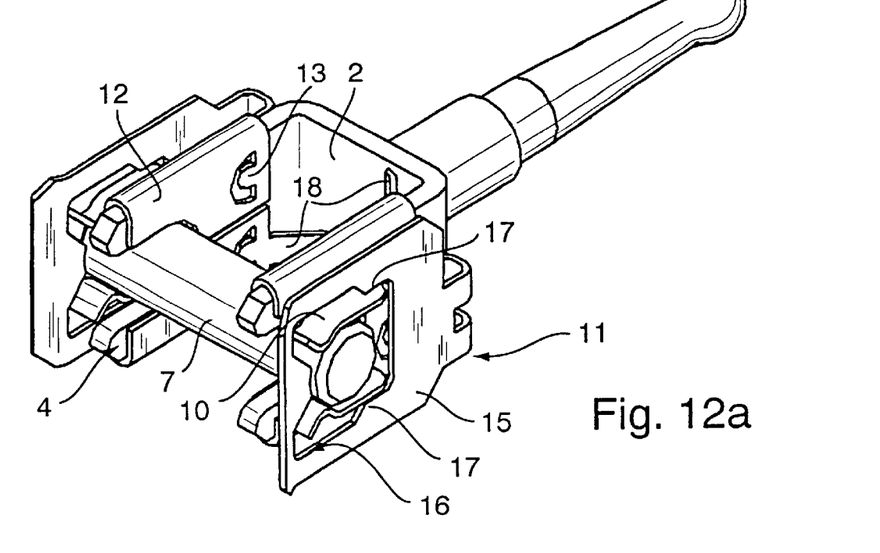
Figure 12B:
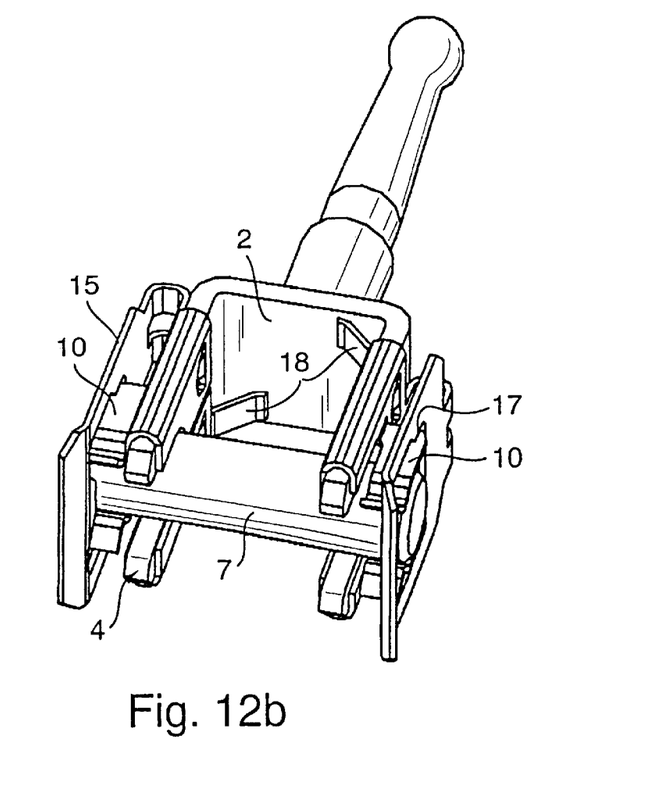

The clamping structure 12 is provided, at its end remote from the open end of the recess 5, with support fingers 28, which abut the base of the fork 2 in order to ensure engagement of the projections 13 with the respective openings 14 of the legs 4 of the fork 2. As shown in FIGS. 12a and 12b, these projections 13 are bent-out sections of the clamp structure 12.

Figure 13:
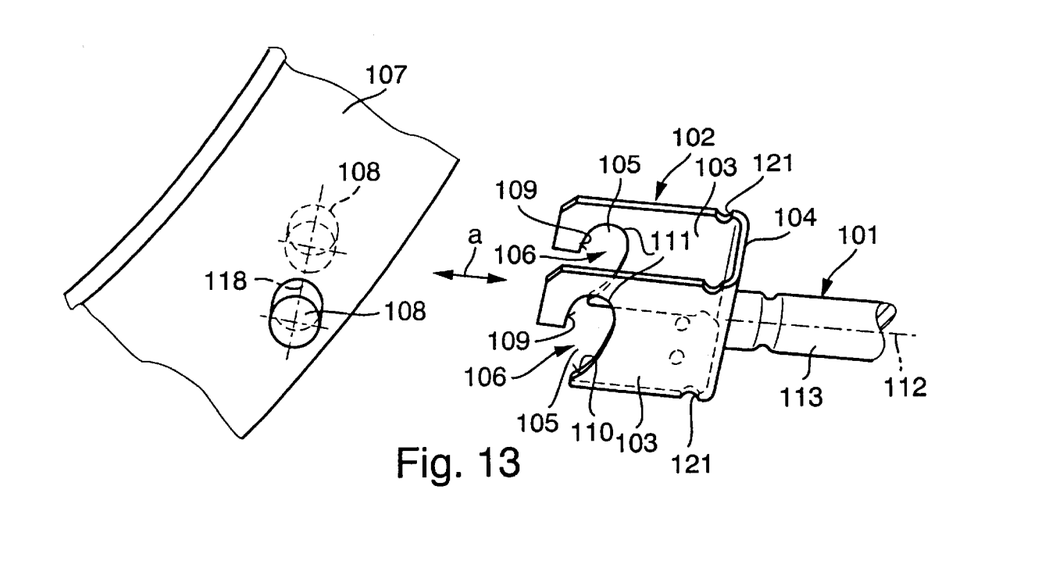
FIG. 13 shows a first component with a fork separate from a second component with a bolt.

FIG. 13 shows a first component 101 provided with a U-shaped fork 102, which has two essentially flat parallel legs 102 and a base 104 interconnecting the parallel legs 103. The first component 101 is for example the operating rod 113 of a master brake cylinder of a motor vehicle.

Each leg 103 includes a slot 105, which has an opening 106 at one end thereof. In the preferred embodiments as shown in FIG. 13, the opening 106 is directed away from the first component 101.

As shown in FIG. 13, a second component 107, which may be a brake pedal has oppositely projecting studs 108. Instead of two separately attached studs 108, a through-bolt may be provided which extends through the second component 107. It may be attached to the second component 102 by a press fit or a weld connection.

To establish the connection between the two components 101 and 107, the second component 107 is moved relative to the first component 101 such that the bolts 108 enter the opening 106 of the slot 105 in the first component 101 from just below the wall area 109. The insert movement force is essentially parallel to the force transmission direction, which is indicated by the arrow "a". Another wall area 110 essentially opposite the wall area 109 has a ramp-like shape so that the bolt 103, when moved in the direction "a" into the opening 106, comes into contact with the ramp-like wall area 110 and is guided thereby into the slot 105. When reaching its end position in the slot 105, the bolt is radially engaged by an end wall structure 111 of the slot 105 extending between the wall areas 109 and 110. The slot 105 has an open area where it will not engage the bolt 108 adjacent the wall area 109 whereby insertion of the bolt 108 into, or its removal from, the slot 105 in the direction of force application "a" is facilitated. Nevertheless, the slot 105 has a seat area 111 where it engages the bolt 108 in the direction of the force transmission ("a"). The seat area 111 engaging the bolt 108 is preferably concave and has a radius which is equal to, or somewhat larger than, the radius of the bolt 108.

The connection according to the invention is intended to permit the transmission of forces between the component 101 and the component 107 in opposite directions as indicated by the arrow "a". If the first and second components are a master brake cylinder and a brake pedal, preferably pressure forces are transmitted and the force transmission direction "a" is parallel to the longitudinal axis 112 of the rod 113 which interconnects the fork 102 and the master brake cylinder.

Figure 14:
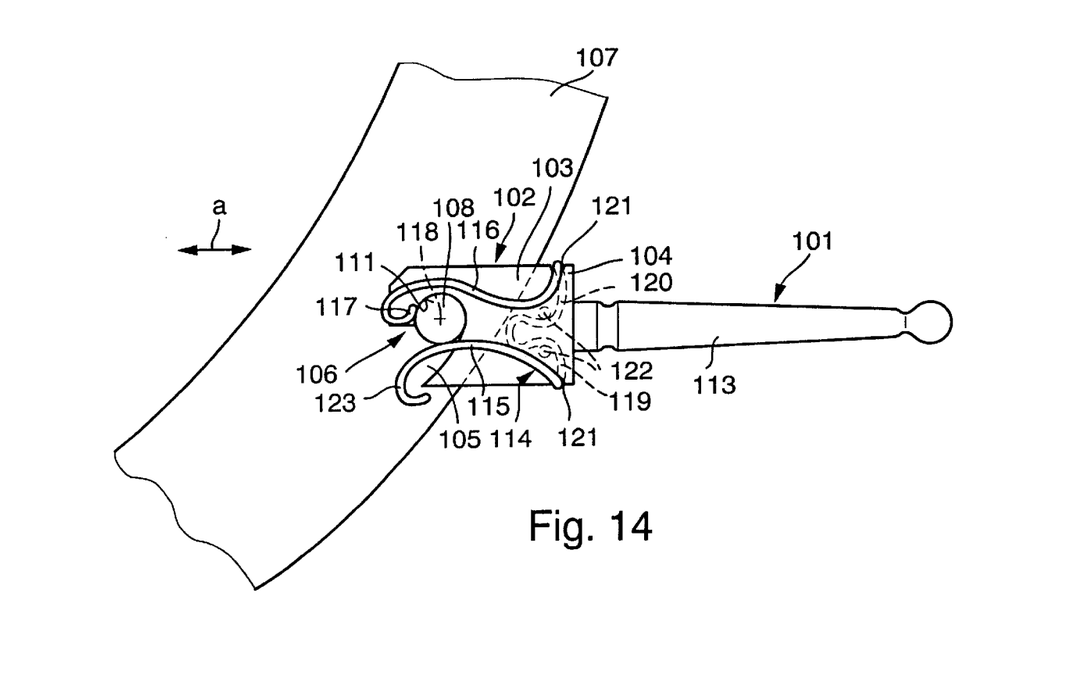
FIG. 14 is a side view of the connection of FIG. 13 with a spring clamp.

FIG. 14 shows the arrangement of FIG. 13 provided with a spring clamp 114. The spring clamp 114 includes a first spring leg 115, which has a convex shape with respect to the bolt 108. An end portion 123 of the first spring leg 115 adjacent the opening 106 of the recess 105 is so bent that it assists the insertion of the bolt 108 into the slot 105. During insertion of the bolt 108 into the slot 105, the first spring leg is bent downwardly (as shown in FIG. 14), whereby an upwardly directed return force is generated. In the end position of the bolt 108 at the engagement end of the slot 105, as shown in FIG. 14, the first spring leg 115 is still displaced from its rest position downwardly, so that the first spring leg 115 transmits a force to the bolt 108 by which the bolt 108 is biased upwardly into engagement with the wall portion 111 of the slot 105. In order to be able to move the bolt 108 out of the slot 105, first an increasing force of the first spring leg 115 must be overcome. As a result, unwanted disengagement of the connection is prevented. The first spring leg 115 is so formed and so arranged with respect to the opening area and the seat area of the slot 105 that the bolt 108 must be inserted into, or removed from, the slot 105 only against the spring force of the first spring leg 115. The spring leg 115 forces the bolt 108 fully into the seat area once the bolt 108 has been sufficiently far inserted into the slot 105.

The spring clamp 114 includes a second spring leg 116, which is so bent and arranged with respect to the slot 105, that an end section 117 of the second spring leg 116 extends in the normal position of the spring leg 116 (that is, when no bolt is disposed in the slot and the spring leg is relaxed) into the slot 105. It is bent outwardly when a bolt 108 is inserted into the slot 105. The return force generated by the second spring leg 116 biases the bolt 108 into engagement with the wall area 110 of the slot 105 in the first component 101.

Preferably, the contact area of the second spring leg 116, that is, its end section 117, with the bolt 108 is so selected that the transmission of the spring force to the bolt 108 occurs below a longitudinal center axis 118 of the bolt 108 as shown in FIG. 14.

Since the bolt 108 is biased against the wall 111 of the slot 105 in the fork 102, any play present between the bolt 108 and the slot 105 is eliminated. With the spring forces of the two spring legs 115 and 116 of the spring clamp 114 acting in different directions on the bolt 108 for the engagement of the bolt 108 with the wall 111 of the slot 105, the relative position between the bolt 108 and the fork 102, that is, between the first and the second components 101 and 107 is well defined. Since for a brake pedal and the associated master brake cylinder an accurate relative position has to be provided generally only for pressure forces, the bolt 108 is held by the spring forces in firm engagement with the wall area 110 of the first component 101.

In order to prevent inadvertent disengagement of the connection by pulling forces between the components 101 and 107, the bolt 108 is cradled in the desired relative position of the bolt 108 and the fork 102 as shown in FIG. 14 by the end wall 109 of the slot 105 remote from the component 101. As a result, there is a form-locking connection between the components 101 and 107 even in the direction of pulling forces. By a suitable orientation of the wall area 109 subjected to pulling forces (in the embodiment, this wall area 109 extends essentially normal to the force direction "a" and parallel to the longitudinal axis 118 of the bolts 108) during a pulling load, the development of force components which could move the bolt 108 out of the slot 105 is prevented.

The spring clamp 114 includes a base part 119, which interconnects the two spring legs 115 and 116. The base part 119 includes a spring loop 120, which imparts to the base part increased resiliency in longitudinal direction so that the spring legs 115 and 116 are movable relative to each other elastically. This elasticity is required to attach the spring clamp 114 to the leg 103 in the manner shown in FIG. 14. The legs 103 include at their opposite longitudinal edges near the base 104 grooves 121 in which the spring legs 115 and 116 are received under pretension. The spring legs 115 and 116 are disposed at one side of the leg 103 and the base part 119 is disposed at the other side of the leg 103. The leg 103 may additionally have projection 122 at its outer side opposite the spring legs 115 and 116, which projections form supports for the spring loop 120 for locating the spring clamp 114. The spring clamp is preferably formed from a spring wire as a single piece.

Figure 15:
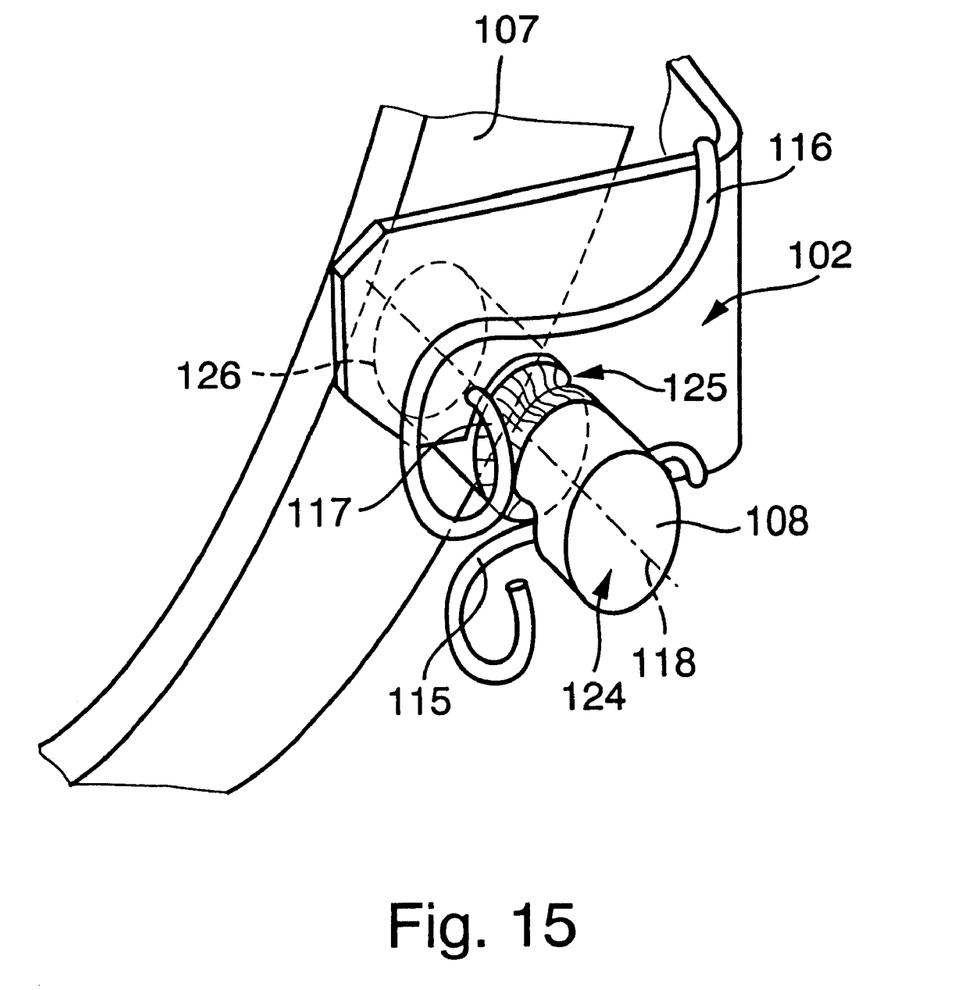
FIG. 15 is a perspective view of another embodiment of a connection according to the invention.

As shown in FIG. 15, the bolts 108 at opposite sides of the second component 107 can be formed by a single bolt 124 which extends through an opening 126 in the second component 107 so that its opposite ends form the bolt sections 124 projecting from the second component 107 in opposite directions. The bolt section 124 must be safely mounted so that the connection according to the invention cannot accidentally disengage. Conventionally, the bolt section 128 is therefore welded to the second component 107. However, this is time-consuming and expensive. Alternatively, the bolt section 124 may be held in position in the opening 126 by a press fit. Then however the insertion of the bolt is relatively complicated particularly if the press fit is to be so tight that no axial displacement of the bolt is possible. In accordance with the invention, the bolt 124 can be received in its proper position by providing the bolt 108 with a groove 125 which extends transverse to the longitudinal axis 118 of the bolt 108 that is the bolt section 124 and by retaining means which are mounted to the fork 102 and extend into the groove 125. In the embodiment shown in FIG. 15, the groove 125 is an annular groove. With respect to the longitudinal axis 118, the groove 125 is so placed on the bolt 108 that the lower first spring leg 115 as well as the end portion 117 of the upper second spring leg extend through the groove 125 and establish a form-fitting secure engagement preventing axial displacement of the bolt portion 124. With the safety arrangement proposed herewith a slide fit may be provided for the bolt 124 in the opening 126, whereby the mounting of the bolt 124 is facilitated.

What is claimed is:

1. A connection between a first component and a second component comprising: a first component having a U-shaped fork with two essentially parallel spaced legs, said spaced legs having recesses with curved support surfaces formed therein, a second component having a portion disposed between said spaced parallel legs and a bolt extending normal to a planes in which said parallel spaced legs are disposed and having opposite ends received in the recesses of said spaced parallel legs, and U-shaped spring clamps connected to said spaced parallel legs and having spring arms which are essentially in alignment with said spaced parallel legs and which extend partially around the bolts received in said recesses and engage the bolt at the side opposite said curved support surface so as to bias said bolt into engagement with said curved support surface thereby holding said bolt pivotally supported in said recesses for pivotally interconnecting said first and second components without play.

2. A connection according to claim 1, wherein said curved support surfaces have a radius of curvature corresponding essentially to the radius of said bolt.

3. A connection according to claim 1, wherein securing means are provided which secure the bolt inserted into said recesses in engagement with said fork.

4. A connection according to claim 3, wherein said securing means are tongues extending essentially parallel to said legs and resiliently engaging said bolt, said tongues being connected to said fork in an area remote from the free ends of said legs and having openings which are arranged in alignment with said bolt when said bolt is positioned in said recesses adjacent said curved surfaces, said bolt having end portions received in said openings so as to be captured in said recesses.

5. A connection according to claim 1, wherein, for the bidirectional transmission of pull and pressure forces between the first and second components, said bolt is engaged by wall portions of said recesses extending essentially normal to the direction of said pull and pressure forces.

6. A connection according to claim 5, wherein wall areas of said recesses subjected to pressure forces of said bolt are in the form of ramps which are so oriented that the bolt ends are guided into said recesses and into engagement with said curved recess areas when subjected to pressure forces.

7. A connection according to claim 5, wherein said spring clamps include first spring legs which engage said bolt so as to spring-bias said bolt in a direction transverse to the direction of force transmission and transverse to the longitudinal bolt axis and against the walls of said recesses to hold said bolt in engagement with said recess walls.

8. A connection according to claim 7, wherein said spring clamp includes a second spring leg which biases said bolt into engagement with said recess area which is engaged by said bolt when subjected to pressure forces.

9. A connection according to claim 7, wherein said spring legs are joined by a base part and form together an essentially U-shaped spring clamp.

\* \* \* \* \*